Figure 1:
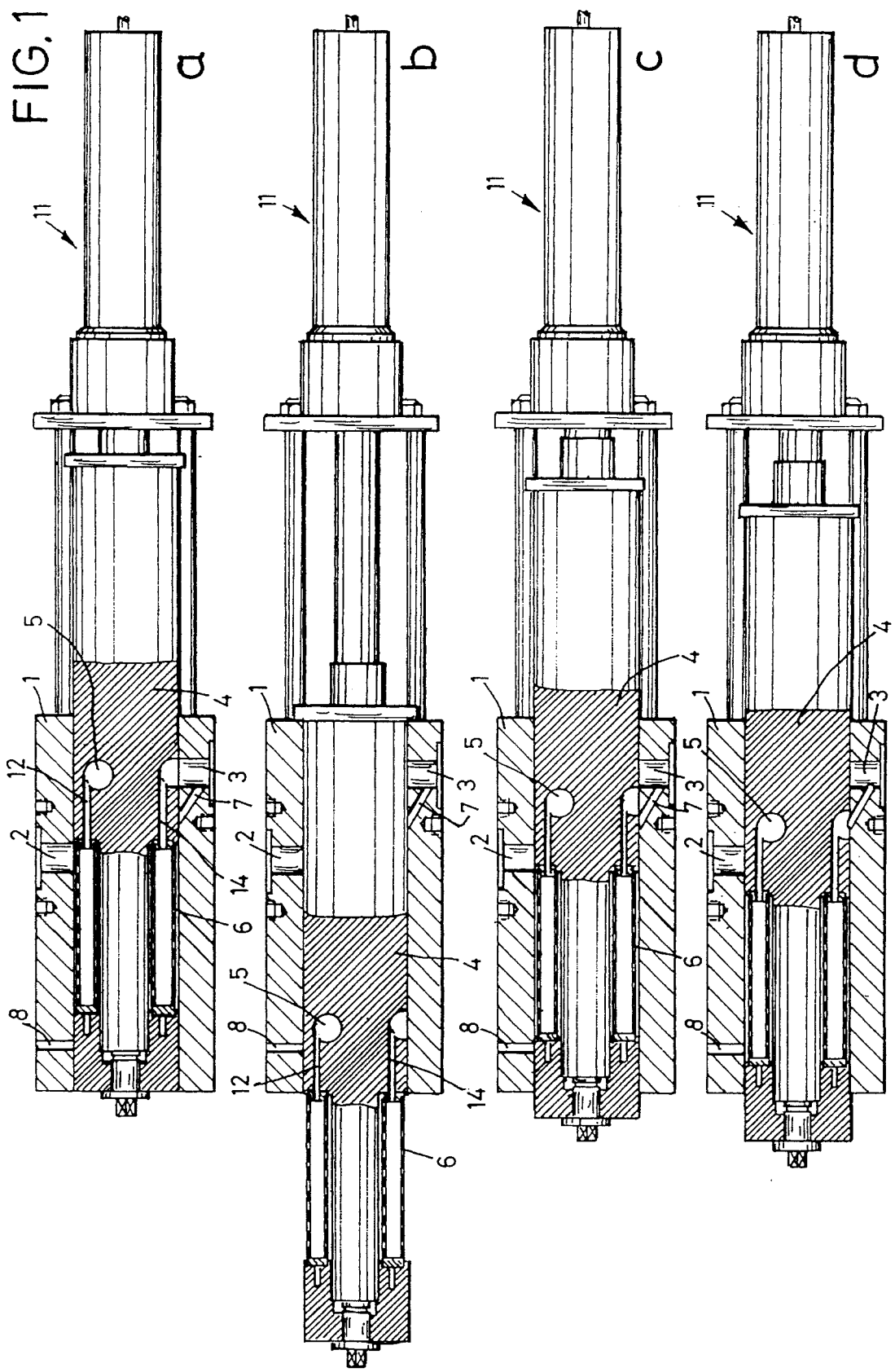

United States Patent [19]

Kreyenborg

[11] Patent Number: 5,578,207
[45] Date of Patent: Nov. 26, 1996

[54] FILTER DEVICE FOR EXTRUDERS HAVING A SCREEN PLUNGER WITH LONGITUDINALLY ARRANGED CANDLE FILTERS

[75] Inventor: Jan U. Kreyenborg, Munster, Germany

[73] Assignee: Firma Kreyenborg Verwaltungen und Beteiligungen KG, Germany

[21] Appl. No.: 430,753

[22] Filed: Apr. 27, 1995

[30] Foreign Application Priority Data

May 3, 1994 [DE] Germany ............................ 44 15 477.1
Jun. 9, 1994 [DE] Germany ............................ 44 20 119.2

[51] Int. Cl.⁶ .............................. B01D 29/52; B01D 29/66
[52] U.S. Cl. ........................ 210/323.2; 210/324; 210/359; 210/412; 210/489; 210/493.1; 425/197; 425/199
[58] Field of Search ........................................ 425/197, 199; 210/323.2, 333.1, 359, 391, 411, 412, 416.1, 489, 493.1, 324, 330

[56] References Cited

U.S. PATENT DOCUMENTS 4,755,290  7/1988  Neuman et al. .................... 425/199
4,849,103  7/1989  Schmidt et al. .................... 425/199
5,062,952  11/1991  Neuman ............................. 425/197
5,122,286  6/1992  Kreyenborg et al. .
5,141,631  8/1992  Whitman ........................... 210/333.1
5,246,660  9/1993  Tsutsumi ........................... 425/197
5,462,653  10/1995  Hills .................................. 210/323.1

FOREIGN PATENT DOCUMENTS 4125181  6/1992  Germany .

*Primary Examiner*—W. L. Walker
*Attorney, Agent, or Firm*—Merchant, Gould, Smith, Edell, Welter & Schmidt, PA

[57] ABSTRACT

The invention relates to a filter device for extruders and injection-molding machines, the screen elements being formed by a candle filter and, if required, by a plurality of candle filters, which are arranged in the circumferential direction on the screen plunger, extending parallel to the longitudinal axis of the screen plunger, and are flowed through from the outside inward for filtering purposes and from the inside outward for backwashing purposes.

6 Claims, 2 Drawing Sheets

FILTER DEVICE FOR EXTRUDERS HAVING A SCREEN PLUNGER WITH LONGITUDINALLY ARRANGED CANDLE FILTERS The invention relates to a filter device in accordance with the preamble of the main claim.

A generic filter device has been disclosed, for example, by DE-41 25 181 C1, this known arrangement employing a screen pack, the screen aperture plane of which extends transversely to the longitudinal axis of the screen plunger proper. Candle filter cartridges are furthermore provided on the inflow side, i.e. the dirt screen side of the screen pack. Thus, in a normal filter device, a fine filter device or a gel filter device, the approach flow to the candle filter cartridge is from the outside inward and, during backwashing, the plastic is guided through the candle filter cartridge from the inside outward. Since the use of the candle filter cartridges considerably increases the surface area of the screen relative to the normal surface area of a commercially available screen, it is thus possible to increase the time within which backwashing must take place and to increase the frequency of screen replacement.

U.S. Pat. No. 5,122,286 describes a screen plunger with a filter which is arranged parallel to the longitudinal axis of the respective screen plunger and is flowed through from the inside outward. However, the filter area is relatively small for certain applications.

The object on which the invention is based is to further increase the action of such filter devices, i.e. to ensure that an exceptionally large filter area can be made available in commercially available devices.

This underlying object of the invention is achieved by means of the teaching of the main claim.

Advantageous developments are explained in the subclaims.

In other words, the proposal is that candle filter cartridges should also be used in the present case, but these cartridges are not aligned with their longitudinal axis transverse to the displaceable screen plunger but extend along the longitudinal axis of the screen plunger and are flowed through from the outside inward. Preferably, a multiplicity of candle filter cartridges is provided, these being arranged close together on the circumference of the screen plunger, allowing an unexpectedly large filter area to be made available while, on the other hand, the bore in the housing corresponds to the conventional sizes of screen plunger.

If the candle filters are, in addition, designed as pleated filters, the filter surface area is increased again and the output of the machine is thus improved.

If—as is customary—two screen plungers are arranged in one housing, replacement of the filter cartridges is simple and does not require the machine to be stopped, i.e. the start-up valves, which were hitherto required in the prior art, are avoided.

An exemplary embodiment of the invention is explained below with reference to the drawings. The drawings show, in FIG. 1 a screen plunger arranged in a housing and a–d having inserted candle filter cartridges, in the four different positions which are possible, in FIG. 2 section through a housing with two screen plungers arranged one above the other, and in FIG. 3 a diagrammatic representation of part of a pleated candle filter.

FIGS. 1a to 1d show a housing 1 in which a screen plunger 4 can be displaced backward and forward in leak-tight fashion with a sucking action, the drive of this screen plunger being provided by a hydraulic cylinder arrangement 11 not shown in greater detail. On its circumference, the screen plunger 4 proper has a recess in which the candle filters 6 visible in the drawing are arranged in the circumferential direction on the screen plunger 4, extending parallel to the longitudinal axis of the screen plunger 4. An inlet passage 2 and an outlet passage 3 are provided in the housing 1.

The screen plunger 4 proper additionally contains an annular passage 5, which is connected by way of branch passages 12 and 14 to the interior of the candle filters 6 proper.

In the exemplary embodiment depicted, 7 denotes a backwash inlet passage and 8 denotes a backwash outlet passage, the backwash inlet passage 7 being connected to the inside of candle filter 6 and a backwash outlet passage 8 being connected to the outside of candle filter 6.

FIG. 1a shows the "production position", in which the material to be filtered is supplied via the inlet passage 2 and flows around the outside of the candle filters 6 and, owing to the prevailing pressure, is forced into the interior of said filters through the screening surface of the candle filters 6. From here, the filtered material emerges through the branch passages 12 and 14 and passes into the annular passage 5 and, from the latter, into the outlet passage 3.

If the candle filters 6 themselves are to be replaced, the screen plunger 4 is guided into the position shown in FIG. 1b, in which, on the one hand, the inlet passage 2 and the outlet passage 3 are closed by the body of the screen plunger 4 but the backwash outlet passage 8 and the backwash inlet passage 7 also remain closed.

FIG. 1c shows a shut-off position, which requires no further explanation.

FIG. 1d shows the backwashing position and it can be seen that the backwash inlet passage 7 is now connected, via the annular passage 5, to the interior of the candle filters 6, and the outside of the candle filters 6 is connected to the outside of the housing 1 by the backwash outlet passage 8.

Figure 2:
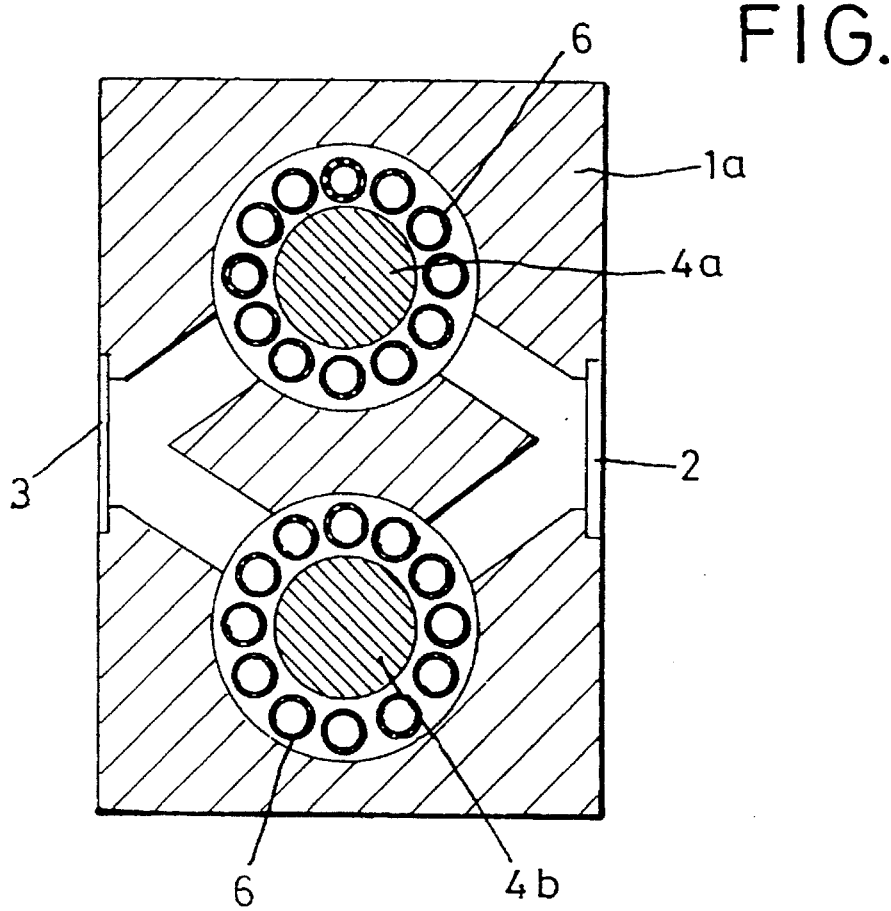

In the illustration given in FIG. 2, a housing 1a is shown in section. Arranged in the housing, one above the other, are two screen plungers 4a and 4b, which are connected by corresponding subpassages to the inlet passage 2 and the outlet passage 3, respectively, as generally known in the prior art.

In such an arrangement, it is possible, when one screen plunger 4a is in the production position, to move the other screen plunger 4b into the replacement position in accordance with FIG. 1b, allowing the filter candles to be replaced without interrupting production.

Figure 3:
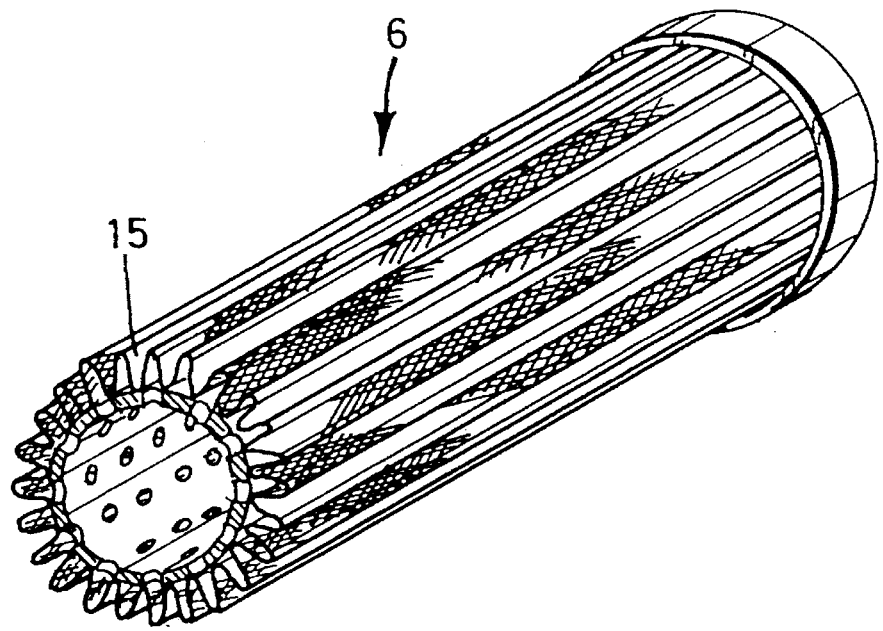

With a view merely to illustrating the fundamental idea, FIG. 3 shows part of a pleated candle filter 6, and it can be seen that the screening surface is considerably increased by the large number of pleats 15.

I claim:

1. A filter device for extruders and injection-molding machines for the continuous processing of thermoplastics, with at least one screen plunger, which is arranged displaceably between an inlet passage and an outlet passage of a housing and has replaceable screen elements with an inlet flow side and an outlet flow side, wherein the screen elements are formed by a multiplicity of candle filters, said candle filters being arranged one above another in a circumferential direction on the screen plunger and extending parallel to the longitudinal axis of the screen plunger.

2. The filter device as claimed in claim 1, wherein a backwash inlet passage emerges at one section into the outlet passage and at a second section into the space in the housing which accommodates the screen plunger, and a backwash outlet passage emerges to the outside from the space accommodating the screen plunger within the housing.

3. The filter device as claimed in claim 2, wherein, viewed along the length of the candle filter part of the screen plunger, the backwash inlet passage and the backwash outlet passage are arranged at opposite ends.

4. The filter device as claimed in claim 3, wherein the candle filters can be flowed through from the outside inward for filtering purposes and from the inside outward for backwashing purposes.

5. The filter device as claimed in claim 1, wherein the interior of the candle filters is connected to an annular passage which is formed in the screen plunger and, in the production position, can be moved into connection with the outlet passage of the housing.

6. The filter device as claimed in claim 1, wherein the candle filters are designed as pleated filters.

\* \* \* \* \*